(12) United States Patent
Darling et al.

(10) Patent No.: US 7,093,460 B2
(45) Date of Patent: Aug. 22, 2006

(54) COOLING CIRCUIT APPARATUS AND METHOD

(75) Inventors: Brian Darling, Asheville, NC (US); Chaun Weng, Weaverville, NC (US); James D. Nye, Asheville, NC (US)

(73) Assignee: Kendro Laboratory Products, LP, Newtown, CT (US)

( * ) Notice: Subject to any disclaimer, the term of this patent is extended or adjusted under 35 U.S.C. 154(b) by 0 days.

(21) Appl. No.: 10/976,784

(22) Filed: Nov. 1, 2004

(65) Prior Publication Data

US 2005/0126213 A1 Jun. 16, 2005

Related U.S. Application Data

(63) Continuation of application No. 10/727,600, filed on Dec. 5, 2003, now Pat. No. 6,845,632.

(51) Int. Cl.
*F25B 41/00* (2006.01)
*F25B 49/00* (2006.01)

(52) U.S. Cl. .......................... 62/498; 62/197

(58) Field of Classification Search ............... 62/197, 62/498, 509, 513
See application file for complete search history.

(56) References Cited

U.S. PATENT DOCUMENTS

| | | |
|---|---|---|
| 4,419,866 A | 12/1983 | Howland ............... 62/228.4 |
| 5,291,941 A | 3/1994 | Enomoto et al. |
| 5,557,941 A | 9/1996 | Hanson et al. .............. 62/160 |
| 5,755,104 A | 5/1998 | Rafalovich et al. |
| 6,351,959 B1 | 3/2002 | Hirota |
| 6,845,632 B1 * | 1/2005 | Darling et al. .............. 62/498 |

* cited by examiner

*Primary Examiner*—Melvin Jones
(74) *Attorney, Agent, or Firm*—Baker & Hostetler LLP

(57) ABSTRACT

A cooling circuit through which coolant flows, for use with a refrigerated cabinet. The cooling circuit includes a compressor and a condenser with a flow path extending there between. The cooling circuit also includes an evaporator and a second flow path that extends between the evaporator and the condenser. The cooling circuit additionally includes a suction accumulator and a flow path extending between the evaporator and the suction accumulator, while a fourth flow path extends between the suction accumulator and the compressor. The cooling circuit also includes a coolant bypass and a switch that switches the cooling circuit between a cycling mode and a non-cycling mode.

11 Claims, 4 Drawing Sheets

COOLING CIRCUIT APPARATUS AND METHOD

This application is a Continuation of U.S. patent application Ser. No. 10/727,600, filed Dec. 5, 2003, entitled COOLING CIRCUIT APPARATUS AND METHOD, now U.S. Pat. No. 6,845,632, the disclosure of which is incorporated herein by reference.

FIELD OF THE INVENTION

The present invention relates generally to the field of refrigerated cabinets. More particularly, the present invention relates to an apparatus and method for providing a cooling circuit for use with a refrigerated cabinet, such as a refrigerator and/or freezer, that efficiently maintains a precise or stable refrigerated cabinet temperature, thereby reducing air pressure fluctuations within the interior of the refrigerated cabinet.

BACKGROUND OF THE INVENTION

Currently, refrigerated cabinets such as refrigerators and/or freezers, generally employ a single vapor-compression circuit to cool or maintain the temperature of the refrigerated cabinet. Typically, the refrigeration circuit uses a refrigerant or coolant gas which is cycled through the refrigeration circuit. During the cooling process, the refrigerant or coolant gas is compressed in a compressor unit causing the coolant to become hot. The heat generated by the aforementioned compression is then removed generally by passing the compressed gas through a water or air cooled condenser coil. The cooled, condensed liquid is then allowed to rapidly expand into an evaporating coil where the expanded gas becomes much colder, thus cooling the coil and the cabinet around which, or within which, the evaporating coil is placed.

Refrigerated cabinets employing vapor-compression circuits or systems similar to the circuit or system described above, are typically designed to cycle the vapor-compression circuit or system on and off in order to hold or maintain the cabinet temperature at a desired setting. Oftentimes, the aforementioned on and off cycling of the vapor-compression circuit or system may cause strain on the system's mechanical components such as the compressor. This cycling may also cause temperature fluctuations within the cabinet, and hence, air pressure fluctuations, within the cabinet. These temperature fluctuations often times cause undesired frost formation within the cabinet due to the pressure differential between the interior of the refrigerated cabinet and the outside environment, as a result of the varying cabinet air temperatures.

One current method for reducing the likelihood of the above-described temperature fluctuations includes adding a liquid refrigeration bypass circuit to the vapor-compression circuit. The bypass circuit allows for a portion of the liquid refrigerant or coolant to circumvent or bypass the evaporator, thus modulating the refrigerant or coolant flow capacity into the evaporator. This modulation of the flow of the liquid refrigerant or coolant into the evaporator causes the interior refrigerated cabinet temperature to be more stable thereby causing the air pressure within the cabinet to be more stable. Moreover, the aforementioned method allows for the compressor to run continuously and not cycle on and off.

The aforementioned method for addressing temperature fluctuation with refrigerated cabinets has drawbacks however. Due to the bypass circuit, the compressor runs constantly, causing the refrigerated cabinet to consume more energy than a refrigerated cabinet that employs a compressor that cycles on and off. Moreover, due to the constant operation of the compressor, operational noise levels of the refrigerated cabinet are increased.

Accordingly, there is a need in the art to provide a cooling circuit apparatus and method for use with refrigerated cabinets and the like, that allows for efficient, precise temperature control. Also, there is a further need for a cooling circuit apparatus and method for use with refrigerated cabinets that have a refrigerant or coolant bypass feature that may be activated and inactivated as desired.

SUMMARY OF THE INVENTION

The foregoing needs are met, to a great extent, by the present invention, wherein in one aspect, a cooling circuit for use with a refrigerated cabinet is provided. The cooling circuit includes a compressor and a condenser, wherein a first flow path extends between the compressor and the condenser. The cooling circuit also includes an evaporator, wherein a second flow path extends between the condenser and the evaporator. The cooling circuit additionally includes a suction accumulator and a third flow path that extends between the evaporator and the suction accumulator. A fourth flow path extends between the suction accumulator and the compressor. The cooling circuit further includes a coolant bypass that extends between the second flow path and the third flow path. The coolant bypass includes a fifth flow path and a flow control valve. Finally, the cooling circuit includes a switch that switches the cooling circuit between a cycling mode and a non-cycling mode.

In accordance with another embodiment of the present invention, a cooling circuit through which coolant flows, for use with a refrigerated cabinet is provided. The cooling circuit includes a compressor and a condenser, wherein a first flow path extends between the compressor and the condenser. The cooling circuit also includes an evaporator, wherein a second flow path extends between the condenser and the evaporator. The cooling circuit additionally includes a suction accumulator and a third flow path that extends between the evaporator and the suction accumulator. A fourth flow path extends between the suction accumulator and the compressor. The cooling circuit further includes a coolant bypass that extends between the first flow path and the second flow path. The coolant bypass includes a fifth flow path and a flow control valve. Finally, the cooling circuit includes a switch that switches the cooling circuit between a cycling mode and a non-cycling mode.

In accordance with still another embodiment of the present invention, a cooling circuit through which coolant flows, for use with a refrigerated cabinet is provided, comprising: means for providing a cooling circuit through which coolant flows, comprising: a compressor; a condenser, wherein a first flow path extends between a said compressor and said condenser; an evaporator, wherein a second flow path extends between said condenser and said evaporator; a suction accumulator, wherein a third flow path extends between said evaporator and said suction accumulator and wherein a fourth flow path extends between said suction accumulator and said compressor; a coolant bypass that extends between said second flow path and said first flow path, wherein said coolant bypass comprises a fifth flow path and a flow control valve; and a switch that switches the cooling circuit between a cycling mode and a non-cycling mode; means for selecting a desired air temperature for the refrigerated cabinet; and means for selecting an operating mode from the cycling mode and the continuous mode using the switch.

In accordance with yet another embodiment of the present invention, a method for cooling a refrigerated cabinet, comprising the steps of: providing a cooling circuit through which coolant flows, comprising: a compressor; a condenser, wherein a first flow path extends between said compressor and said condenser; an evaporator, wherein a second flow path extends between said condenser and said evaporator; a suction accumulator, wherein a third flow path extends between said evaporator and said suction accumulator and wherein a fourth flow path extends between said suction accumulator and said compressor; a coolant bypass that extends between said second flow path and said first flow path, wherein said coolant bypass comprises a fifth flow path and a flow control valve; and a switch that switches the cooling circuit between a cycling mode and a non-cycling mode; selecting a desired air temperature for the refrigerated cabinet; and selecting an operating mode from the cycling mode and the non-cycling mode using the switch.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
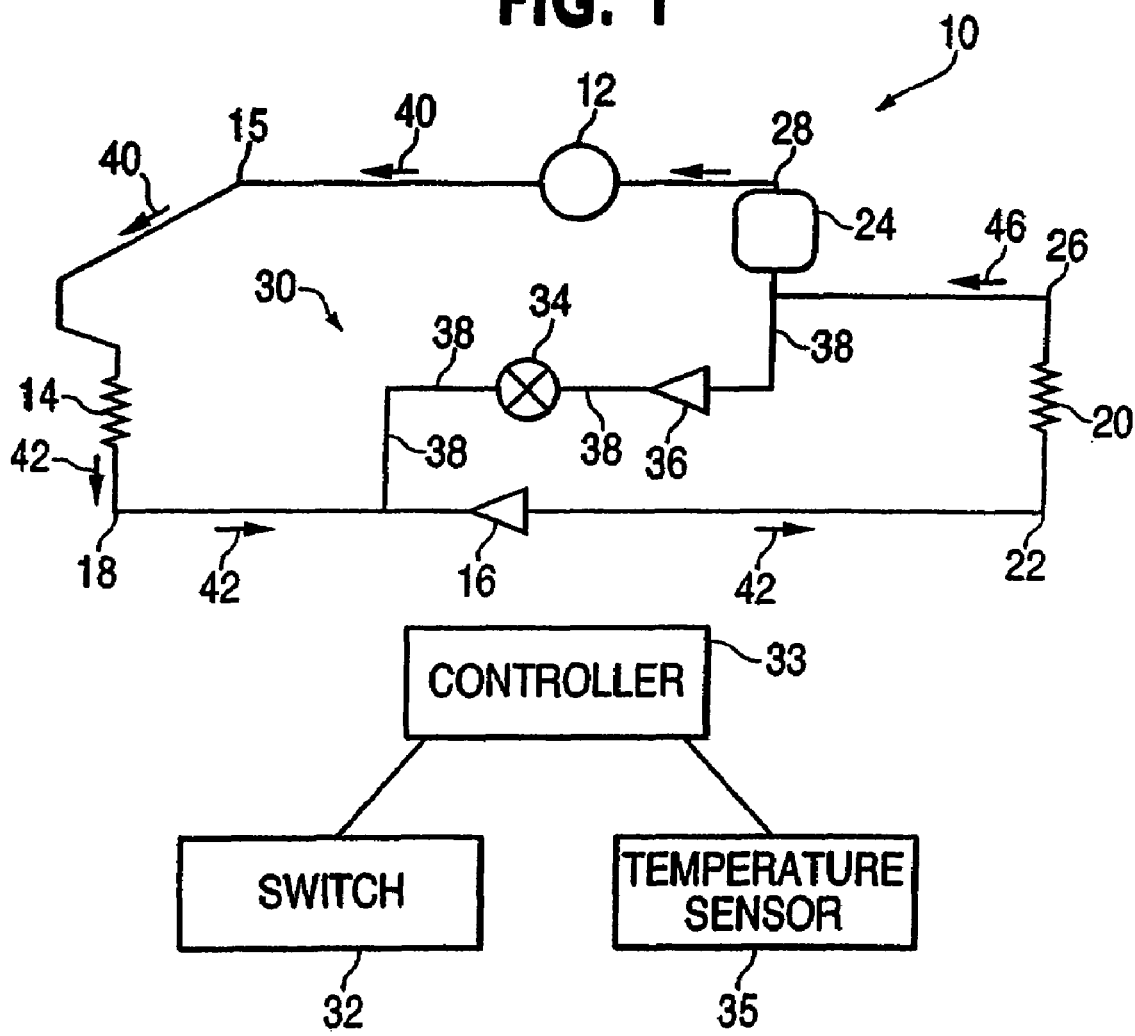
FIG. 1 is a schematic view of a cooling circuit apparatus for use with a refrigerated cabinet in accordance with an embodiment of the present invention.

Various preferred embodiments of the present invention provide for a cooling circuit apparatus and method for use with a refrigerated cabinet. The cooling circuit apparatus and method provides the benefits of both a cycling and non-cycling compressor system in a single unit. In some arrangements, the cycling mode of the cooling circuit apparatus and method is utilized while in other arrangements the non-cycling mode of the cooling circuit apparatus and method is utilized. It should be understood, however, that the present invention is not limited in its application to refrigerated cabinets, but, for example, can be used with other temperature control cabinets or apparatuses that require precise temperature and/or precise air pressure control. Preferred embodiments of the invention will now be further described with reference to the drawing figures, in which like reference numerals refer to like parts.

Referring now to the figures, FIGS. 1–4 illustrate a cooling circuit apparatus, generally designated 10, for use with a refrigerated cabinet in accordance with an embodiment of the present invention. The cooling circuit apparatus 10 includes a compressor 12 that is connected to a condenser 14 via a conduit or tubing section 15, and a first expansion device 16. The condenser 14 and the first expansion device 16 are connected via a conduit or tubing section 18. The cooling circuit apparatus 10 also includes an evaporator 20 that is connected to the first expansion device 16 by way of a conduit or tubing section 22. The evaporator 20 is also connected to a suction accumulator 24 through a conduit or tubing section 26. As illustrated in FIGS. 1–4, the suction accumulator 24 connects to the compressor 12 via a conduit or tubing 28 to complete the cooling circuit 10.

As depicted in FIGS. 1–4, the cooling circuit apparatus 10 additionally includes a coolant bypass, generally designated by reference numeral 30, a selectable toggle switch 32 and a controller 33. The selectable toggle switch 32 functions to switch the cooling circuit 10 between a cycling mode and a non-cycling mode. The controller 33 is a standard controller known in the art, utilized to control and maintain the temperature of refrigerated cabinets and the like. The controller 33 receives inputs from a temperature sensor 35 which communicates with the controller 35. The temperature sensor 35 can be positioned at varying locations along the cooling circuit apparatus 10. The temperature sensor 35 sends inputs to the controller 33 and in response to these inputs, the controller 33 activates or deactivates the coolant bypass 30. The selectable toggle switch 32 preferably switches the operation of the cooling circuit apparatus 10 between a compressor cycling mode and a compressor non-cycling mode.

Figure 2:
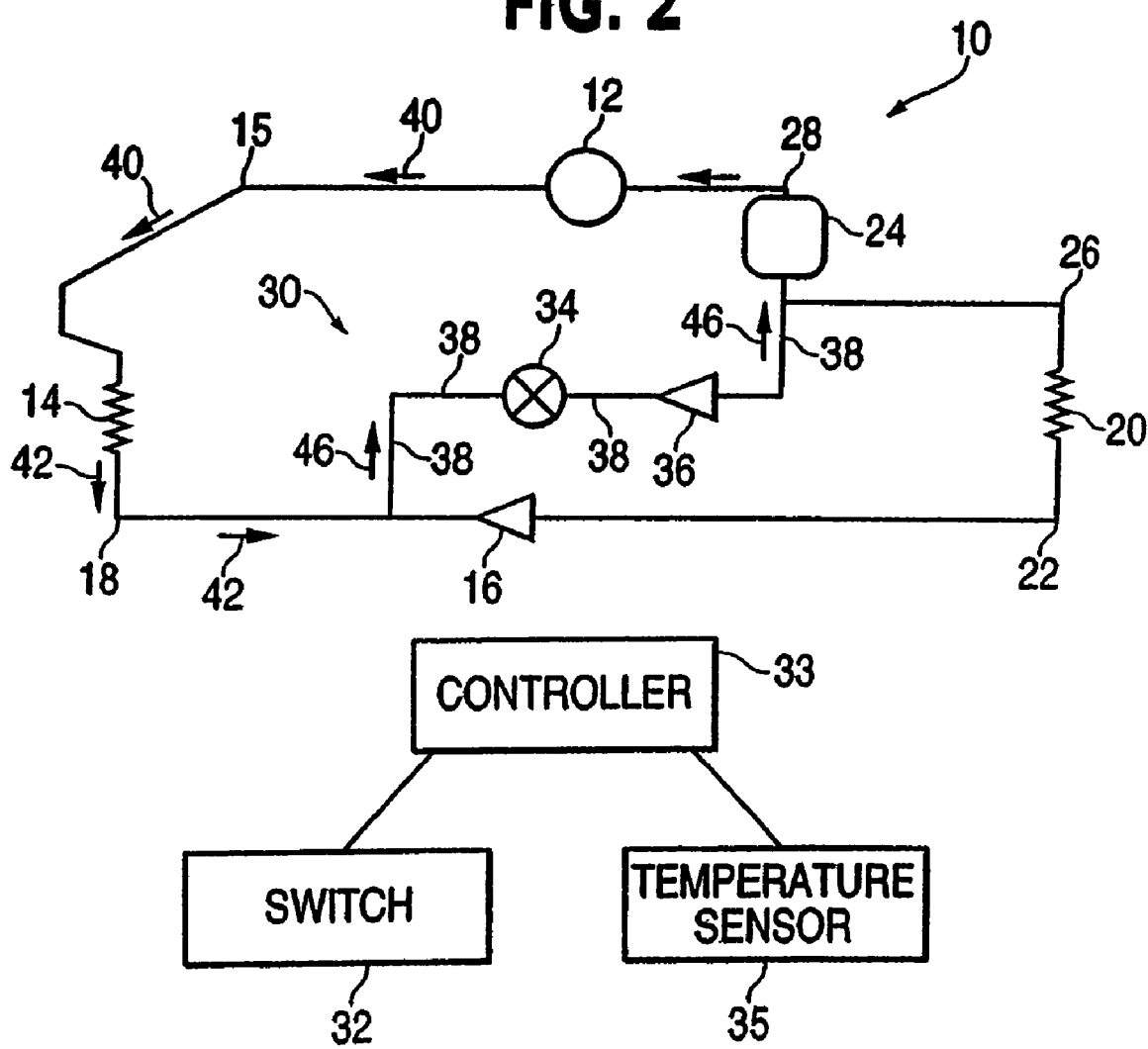
FIG. 2 is a schematic view of a cooling circuit apparatus for use with a refrigerated cabinet in accordance with an embodiment of the present invention.
Figure 3:
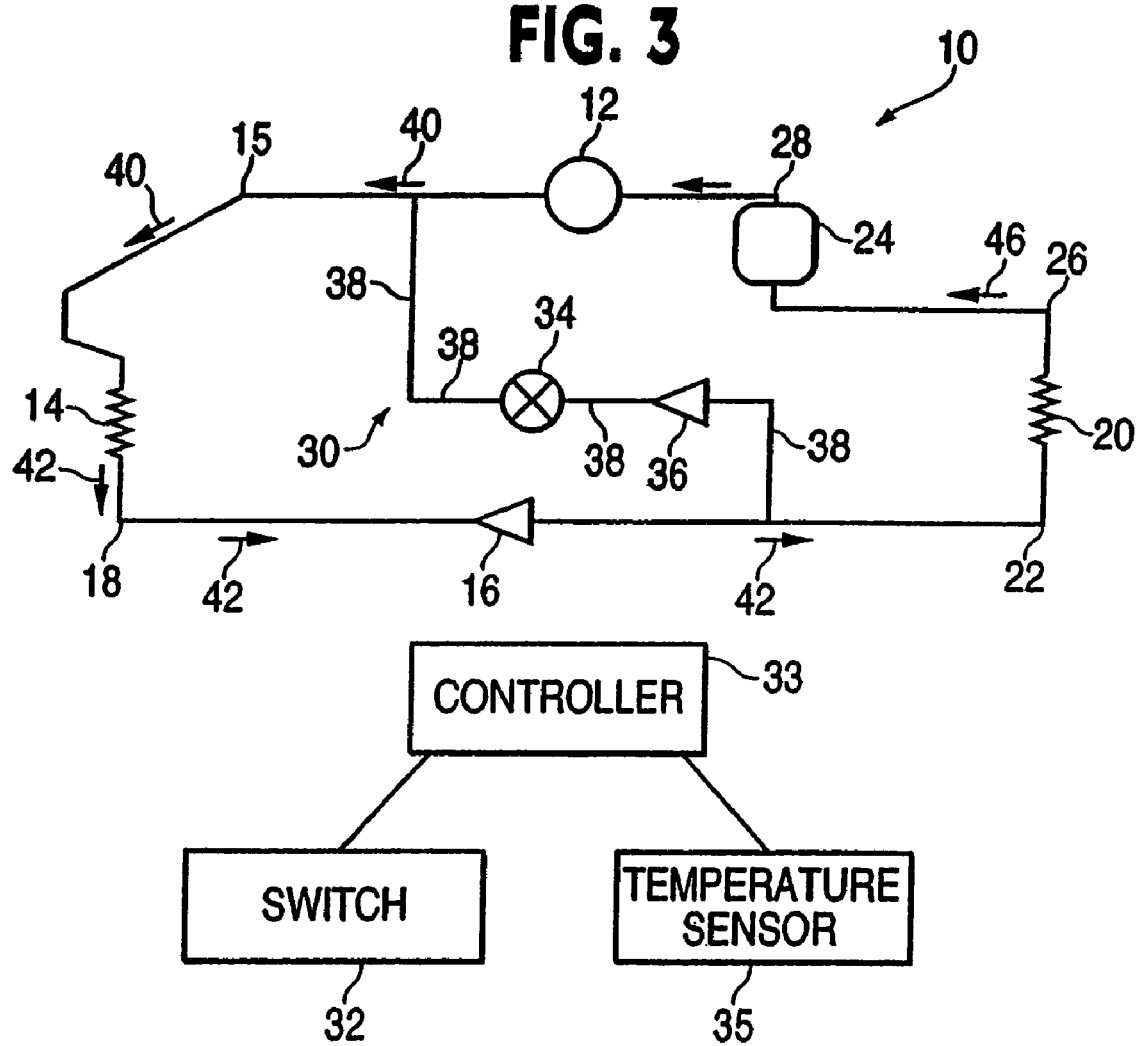
FIG. 3 is a schematic view of a cooling circuit apparatus for use with a refrigerated cabinet in accordance with an alternative embodiment of the present invention.
Figure 4:
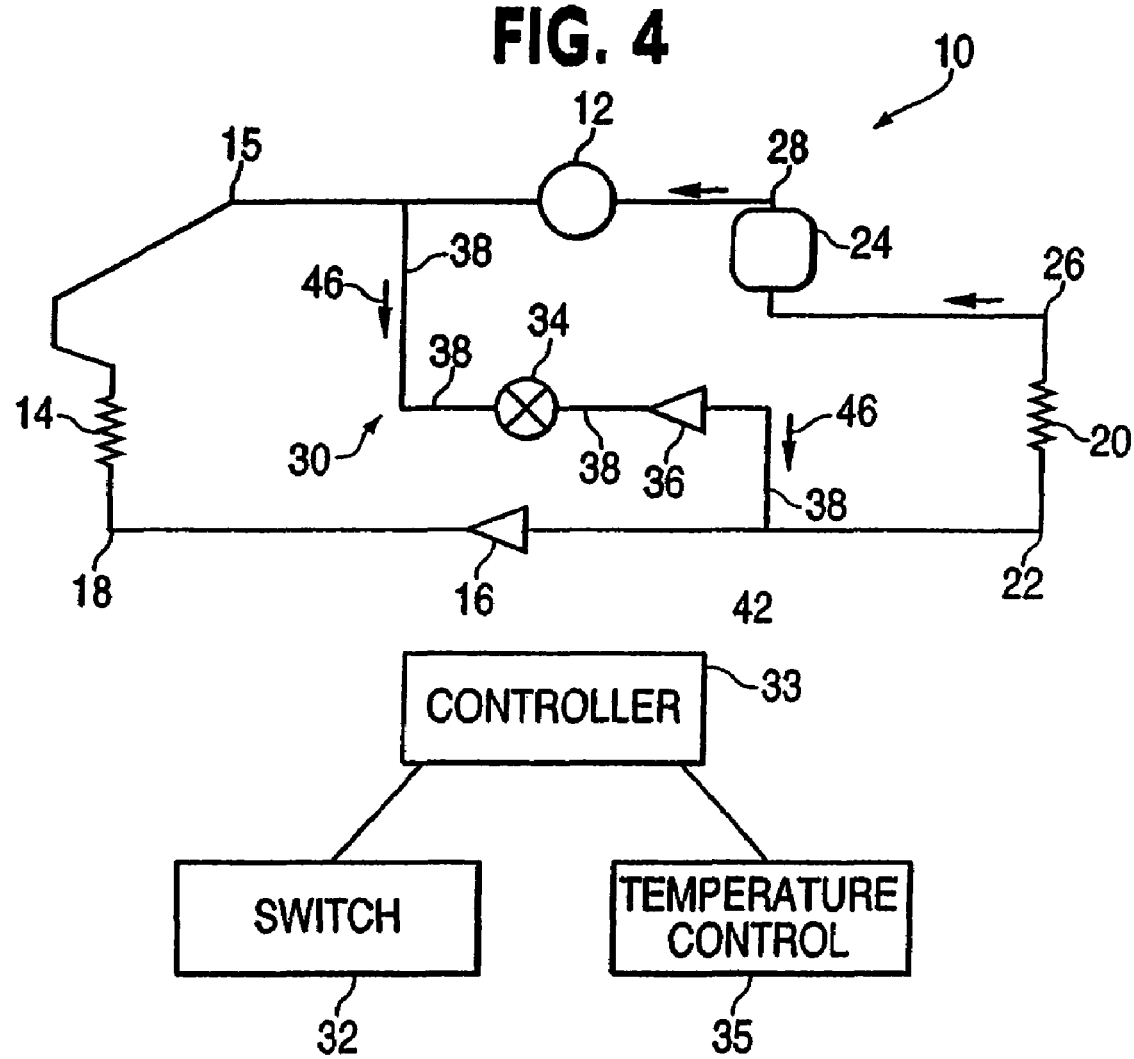
FIG. 4 is a schematic view of a cooling circuit apparatus for use with a refrigerated cabinet in accordance with an alternative embodiment of the present invention.

In embodiments depicted in FIGS. 1 and 2, the coolant bypass 30 extends between conduit section 18 and conduit section 26, while in the embodiments depicted in FIGS. 3 and 4 the coolant bypass 30 extends between conduit section 22 and conduit section 16. The coolant bypass 30 includes a flow control valve 34, for example, a solenoid valve 34 and a second expansion device 36. The solenoid valve 34 can be activate and inactivated by the controller. As illustrated in FIGS. 1–4, the coolant bypass 30 includes conduit or tubing sections 38, similar to those previously described, that combine to form the coolant bypass 30.

In the embodiment illustrated in FIGS. 1 and 2, the coolant bypass 30 reduces the amount of coolant flow that enters the evaporator 20, or enables the coolant flow to bypass the evaporator 20, when the coolant bypass 30 is activated. Alternatively, in the alternative embodiment depicted in FIGS. 3 and 4, the coolant bypass 30 reduces the amount of coolant that enters the condenser 14, or enable the coolant flow to bypass the condenser, when activated.

As depicted in FIGS. 1–4, the compressor 12 is preferably any standard compressor known in the art that compresses gas or vapor. The compressor 12 functions to compress coolant vapor and/or a coolant vapor/liquid mixture that it receives from the suction accumulator 24. This compression causes the coolant to become extremely hot. The compressor 12 also functions to propel the coolant through the cooling circuit apparatus 10. The compressor 12 is connected to the evaporator 16 by the conduit or tubing section 16. The conduit or tubing section 16 is preferably refrigeration conduit, and may be constructed from any material suitable for refrigeration, for example stainless steel or copper, however alternative materials may be utilized.

As illustrated in FIGS. 1–4, the condenser 14 is preferably any standard condenser known in the art. For example, the condenser 14 may be a water cooled condenser and/or an air cooled condenser. The condenser 14 functions to remove some of the heat contained in the hot compressed coolant. The condenser 14 is connected to both the cooling bypass 30 and the first expansion device 16 via the conduit or tubing section 18. The conduit or tubing section 18 is preferably refrigeration conduit, and may be constructed from any material suitable for refrigeration, such as stainless steel or copper, however alternative materials may be utilized.

The first expansion device 16 is preferably a metering device or pressure reducing valve such as a thermal expansion valve, a capillary tube and/or a needle valve. The first expansion device functions to modulate or control the flow of coolant into the evaporator 20. As depicted in FIGS. 1–4, the first expansion device 16 is connected to the evaporator 20 by the conduit or tubing section 22. The conduit or tubing section 22 is preferably refrigeration conduit, and may be constructed from any material suitable for refrigeration, such as stainless steel or copper, however alternative materials may be utilized if desired.

The evaporator 20 is preferably any standard evaporator known in the art, such as a static cold wall evaporator or a forced air evaporator. The evaporator 20 functions to remove heat from the environment within which or around which, the evaporator is located. The evaporator 20, as illustrated in FIGS. 1–4, is connected to the suction accumulator 24 by the conduit or tubing section 26. The conduit or tubing section 26 is preferably refrigeration conduit, and may be constructed from any material suitable for refrigeration, such as stainless steel or copper, however alternative materials may be utilized.

As illustrated in the figures, the suction accumulator 24 is located between evaporator 20 and the condenser 12 and is essentially a vessel or container that functions to collect or accumulate any residual coolant fluid the exits the evaporator 20. The suction accumulator additionally functions to allow coolant vapor that exits the evaporator 20 to pass onto the condenser 12. The suction accumulator 24 preferably includes a return (not pictured) that can be connected to either the compressor 12 or the conduit section 28. The return allows a minimal amount of liquid coolant that has collected in the suction accumulator, to mix with coolant vapor and return to the compressor 12 to be compressed. The suction accumulator 24 is connected to the compressor 12 via the conduit or tubing section 28. The conduit or tubing section 28 is preferably refrigeration conduit, and may be constructed from any material suitable for refrigeration, such as stainless steel or copper, however alternative materials may be utilized.

Referring now to FIGS. 1 and 2 and the embodiment illustrated therein, as previously mentioned, the bypass 30 extends between conduit section 18 and conduit section 26 and enables a majority of the coolant to bypass the first expansion device 16 and evaporator 20. As illustrated in FIGS. 1 and 2, the coolant bypass 30 includes a solenoid valve 34 that controls the flow of coolant through the coolant bypass 30. The coolant bypass 30 also includes a second expansion device 36. The second expansion device 36 is similar to the first expansion device 16 in that it is preferably a metering device or pressure reducing valve such as a thermal expansion valve, a capillary tube and/or a needle valve. The second expansion device 36 however differs from the first expansion device 16 because it is less restrictive than the first expansion device 16. By less restrictive it is understood that the second expansion device 36 applies lesser resistance to the flow of coolant, and therefore the coolant flows through the second expansion device 36 more easily. Therefore, when the solenoid valve 34 is activated, a majority of coolant will follow the path of lowest resistance and flow through the coolant bypass 30.

Continuing to refer to FIGS. 1 and 2, the cooling circuit apparatus 10 is depicted in the continuous run position or non-cycling compressor mode. By continuous run position or non-cycling compressor mode, it is understood that the end user desires to achieve full cooling and maintain a stable interior cabinet air temperature and air pressure. In this position, the selectable toggle switch 32 is set to a first position, where in this first position, the compressor 12 runs continuously. Also, while in this first position, the solenoid valve 34 is initially deactivated while the cooling circuit operates to achieve the desired set temperature.

During operation of the cooling circuit apparatus 10 in the continuous run position, the end user first selects a desired temperature via the controller 33. During operation, the coolant vapor is compressed in the compressor 12 and it then flows to the condenser 14 through conduit 16, as indicated by the arrows 40. As previously described, at the condenser 14, some of the heat is removed from the coolant and the coolant is condensed. The coolant then proceeds to flow through conduit section 18 and on through the first expansion device 16 as indicated by arrows 42. As previously mentioned, the solenoid valve 34 is closed at this stage of the continuous run position and therefore all of the coolant proceeds to flow into the evaporator 20, providing full cooling to the to the interior environment to the refrigerated cabinet. The coolant then proceeds through the conduit section 26 to the suction accumulator 24, as indicated by the arrow 46, where it then proceeds to return to the compressor 12.

Referring now to FIG. 2, once the desired interior cabinet temperature is obtained, the controller 33 activates the solenoid valve 34 allowing coolant to flow through the coolant bypass 30 as illustrated. As discussed above, the second expansion device 36 is less restrictive than the first expansion device 16 and therefore a majority of the coolant flows through the coolant bypass, bypassing the evaporator 20.

Due to the aforementioned flow of coolant through the bypass 30, the amount of coolant that enters the evaporator 20 is significantly reduced, thus causing the temperature of evaporator 20 to rise. Meanwhile, the liquid coolant flowing through the coolant bypass 30 flows through the solenoid valve 34 and second expansion device 36 and into the suction accumulator 24 as indicated by arrows 46. Once the coolant enters the suction accumulator 24, it mixes with the incoming coolant flow from the evaporator 20. Due to the coolant bypass 30 and the aforementioned mixing of the coolant, the combined coolant vapor that enters the compressor is cold and beneficial to compressor 12 longevity.

Referring now to FIGS. 3 and 4 in this embodiment, once the desired interior cabinet temperature is obtained, as described above, the controller 33 again activates the solenoid valve 34, allowing coolant to flow through the coolant bypass 30 as illustrated in FIG. 4. Again, the second expansion device 36 is less restrictive that first expansion device therefore a majority of the coolant flows through the coolant bypass 30, bypassing the condenser 14.

The cooling circuit apparatus 10 configuration illustrated in FIG. 4 allows for a portion of hot, non-condensed coolant gas to flow through the bypass 30, including the solenoid valve 34 and second expansion device 36, directly into the evaporator 20. This hot, non-condensed coolant gas then mixes with the residual liquid coolant that flowed through the condenser 14, in the evaporator 20. This mixture of hot gas coolant and liquid coolant causes the evaporator temperature to rise, similar to the embodiment depicted in FIGS. 1 and 2.

Once the internal cabinet temperature begins to rise, the controller 33 de-activates the solenoid valve 34 in both embodiments, quickly returning the cooling circuit 10 to full capacity as depicted in FIGS. 1 and 3. The above-described continuous run position of the cooling circuit 10 for both embodiments provides a refrigerated cabinet that is able to maintain a stable and precise interior cabinet air temperature and therefore a stable air pressure, thereby reducing the likelihood of moisture infiltration into the refrigerated cabinet.

Alternatively, when the selectable toggle switch 32 is switched to a second position, the cooling circuit 10 operates in a cycling mode. In the cycling mode, the coolant bypass 30 is disengaged and the compressor cycles on and off in accordance with the temperature settings of the controller 33.

The many features and advantages of the invention are apparent from the detailed specification; and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A cooling circuit through which coolant flows, for use with a refrigerated cabinet, comprising:
   a compressor;
   a condenser, wherein a first flow path extends between said compressor and said condenser;
   an evaporator, wherein a second flow path extends between said condenser and said evaporator;
   a suction accumulator, wherein a third flow path extends between said evaporator and said suction accumulator and wherein a fourth flow path extends between said suction accumulator and said compressor;
   a coolant bypass that extends between said first flow path and said second flow path, wherein said coolant bypass comprises a fifth flow path and a flow control valve; and
   a switch that switches the cooling circuit between a cycling mode and a non-cycling mode.

2. The cooling circuit according to claim 1, further comprising: a first expansion device disposed on said second pathway; and a second expansion device disposed said fifth pathway.

3. The cooling circuit according to claim 1, further comprising: a temperature sensor operable to sense a temperature at a certain location of the cooling circuit; and a control operable to control flow of coolant through the cooling circuit and through said coolant bypass in response to the temperature sensed by said sensor.

4. The cooling circuit according to claim 1, wherein said first, second, third, fourth and fifth flow paths are refrigeration conduits.

5. The cooling circuit according to claim 4, wherein said refrigeration conduits are copper and/or stainless steel.

6. The cooling circuit according to claim 1, wherein said flow control valve is a solenoid valve.

7. The cooling circuit according to claim 1, wherein said first and said second expansion devices are a metering device and/or a pressure reducing valve.

8. The cooling circuit according to claim 7, wherein said metering device and pressure reducing valve include a thermal expansion valve, a capillary tube and/or a needle valve.

9. The cooling circuit according to claim 1, wherein said condenser is a water cooled condenser and/or an air cooled condenser.

10. The cooling circuit according to claim 1, wherein said evaporator is a static cold wall evaporator and/or a forced air evaporator.

11. A cooling circuit through which coolant flows, for use with a refrigerated cabinet, comprising:
   means for providing a cooling circuit through which coolant flows, comprising: a compressor; a condenser, wherein a first flow path extends between a said compressor and said condenser; an evaporator, wherein a second flow path extends between said condenser and said evaporator; a suction accumulator, wherein a third flow path extends between said evaporator and said suction accumulator and wherein a fourth flow path extends between said suction accumulator and said compressor; a coolant bypass that extends between said second flow path and said first flow path, wherein said coolant bypass comprises a fifth flow path and a flow control valve; and a switch that switches the cooling circuit between a cycling mode and a non-cycling mode;
   means for selecting a desired air temperature for the refrigerated cabinet; and
   means for selecting an operating mode from the cycling mode and the continuous mode using the switch.

* * * * *